J. GUTTENSTEIN.
EXHAUST GAS ACTUATED COOLING DEVICE FOR MOTOR VEHICLES.
APPLICATION FILED MAY 23, 1919.

1,362,293.

Patented Dec. 14, 1920.

INVENTOR
J. Guttenstein
BY
Sigmund Herzog
ATTORNEY

UNITED STATES PATENT OFFICE.

JOSEPH GUTTENSTEIN, OF NEW YORK, N. Y.

EXHAUST-GAS-ACTUATED COOLING DEVICE FOR MOTOR-VEHICLES.

1,362,293.  Specification of Letters Patent.  Patented Dec. 14, 1920.

Application filed May 23, 1919. Serial No. 299,360.

*To all whom it may concern:*

Be it known that I, JOSEPH GUTTENSTEIN, a citizen of the Czecho-Slovak Republic, and a resident of New York, in the county of New York and State of New York, have invented certain new and useful Improvements in Exhaust-Gas-Actuated Cooling Devices for Motor-Vehicles, of which the following is a specification.

The present invention relates to motor vehicles, and more particularly to a mechanism that is designed to induce air currents between the radiator sections of the vehicle and past the engine thereof.

One of the objects of the invention is to produce a device of the character mentioned, which is actuated by the exhaust gases of the internal combustion engine of the vehicle, and to so design the said device that it can be conveniently mounted on internal combustion engines, without necessitating material changes in the construction of the latter.

A further object of the invention is to produce a device of the character mentioned which is simple in construction, efficient in operation and which serves at the same time as a muffler for the engine.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
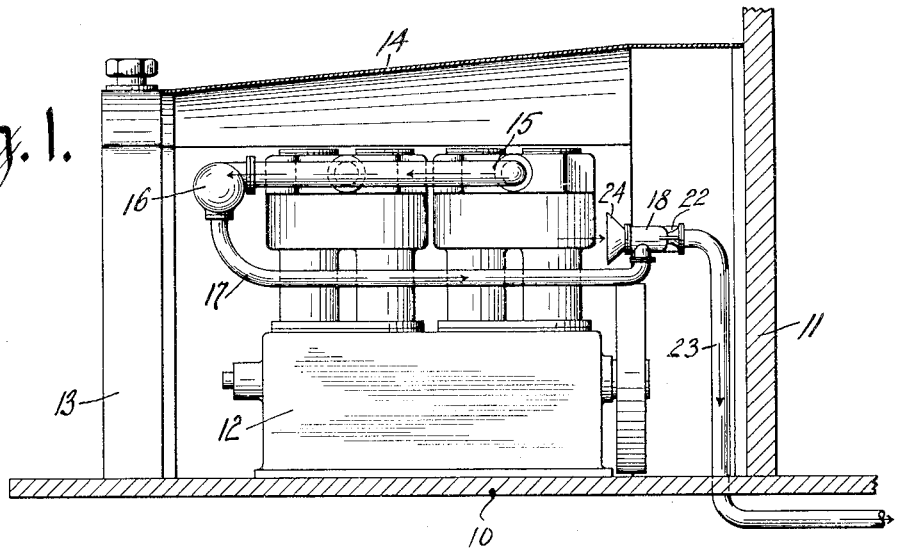
Figure 2:
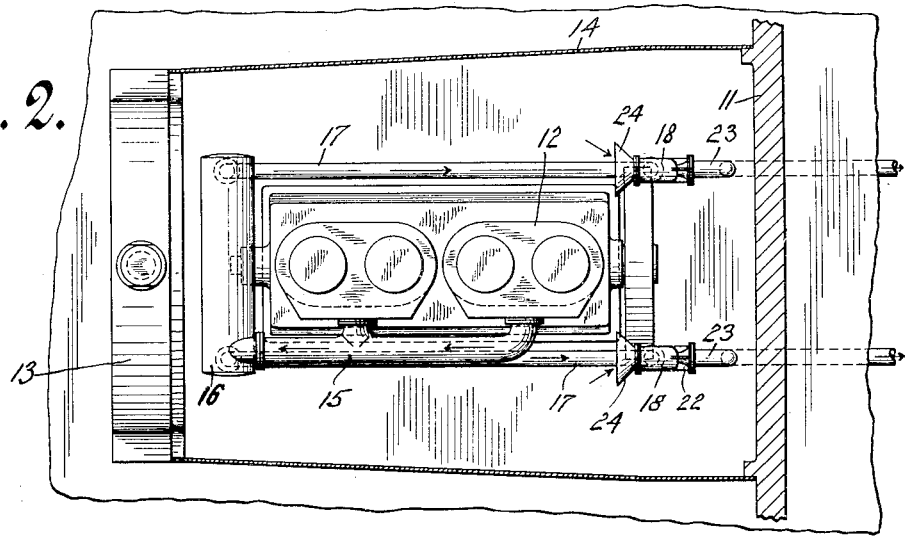
Figure 3:
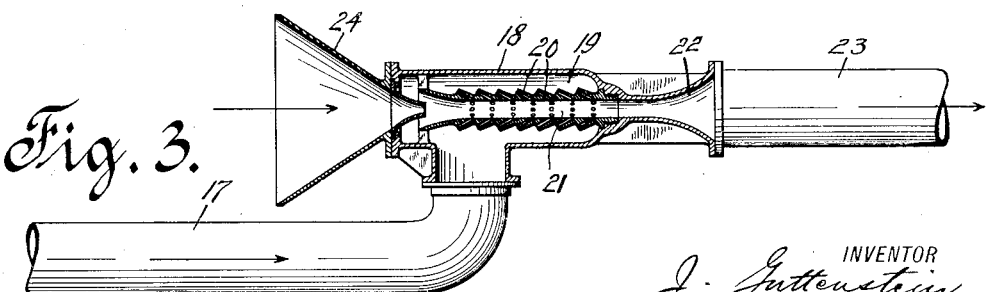

Figure 1 is a vertical longitudinal section taken through the front portion of an automobile with the engine, radiator and the attachment, forming the subject matter of the present application for Letters Patent, in elevation; Fig. 2 is a plan view of the mechanism shown in Fig. 1, the hood of the motor being shown in section; and Fig. 3 is a longitudinal section taken through the attachment, on a larger scale.

The invention consists, generally speaking, in inserting into the exhaust pipe of the internal combustion engine one or more ejectors, which create a partial vacuum under the engine hood, with the result that a continuous flow of air is induced through the interstices between the radiator sections past the engine, thereby cooling the radiator and the engine.

Referring now to the drawings, the numeral 10 indicates that portion of the frame of a motor vehicle which is located forward of the dashboard 11. This frame portion supports the motor 12 of the vehicle, and in front of this motor is disposed a radiator 13. A hood 14 covers the motor, forming with the frame, dashboard and radiator a substantially closed casing for the said motor. The elements so far described may be of any suitable type and construction, a detailed description of which is deemed to be unnecessary, as they do not form part of the present invention.

The exhaust pipe 15 of the engine leads forward to a closed casing 16, that is disposed in front of the engine and extends transversely of the engine. From this casing lead rearward two pipes 17, one on each side of the engine. Each of these pipes leads to an ejector 18 of any suitable construction. The ejector shown in Fig. 3 of the drawings is disclosed for purposes of illustration only, comprising an exhaust receiving chamber 19, that communicates through a plurality of rearwardly inclined passages 20 with a combining tube 21, leading to a delivery tube 22, that is connected to a pipe 23, the latter extending toward the rear of the motor vehicle. In alinement with the combining tube 21 is disposed a funnel-shaped air nozzle 24, the mouth or inlet of which is disposed in rear of the motor 12 and faces the radiator 13. The pipes 23 lead to the atmosphere.

The operation of this device is as follows:—The exhaust gases, passing through the passages 20 into the combining tubes 21 and thence toward the pipes 23, create a partial vacuum at the inner or smaller ends of the funnel-shaped members 24, thereby exhausting the air from under the engine hood and causing thus a flow of air through the interstices between the radiator sections past the engine of the motor vehicle. These air currents effectively cool the cooling fluid in the radiator and also the engine itself. The mixtures of gas and air are discharged into the atmosphere. By reason of the funnel shape of the air nozzles of the ejectors, a large volume of air is continuously drawn in from under the engine hood, so that an effective cooling is obtained.

The ejectors silence or reduce the noise of the exhaust gases of the engine or, in other words, they serve at the same time as mufflers. This is due to the fact that the ejector casings are partitioned off within (the walls of the combining chambers 21), and the partitions are provided with small openings (passages 20).

What I claim is:—

1. In a motor vehicle, the combination with the internal combustion engine, radiator and engine hood of the vehicle, of an ejector inserted into the exhaust pipe of said engine, said ejector being disposed below said hood and having an air inlet facing said radiator, said air inlet being spaced from said radiator and disposed in rear of said engine, thereby receiving air after the same has passed through said radiator and around said engine.

2. In a motor vehicle, the combination with the internal combustion engine and radiator of the vehicle, of a casing disposed in front of said engine connected with the exhaust pipe of said engine, two pipes leading from said casing rearward, one on each side of the engine, and an ejector connected to each pipe, each ejector having an air inlet facing said radiator, said air inlet being spaced from said radiator and being disposed in rear of said engine, thereby receiving air after the same has passed through said radiator and around said engine.

Signed at New York, in the county of New York, and State of New York, this 13th day of May, A. D. 1919.

JOSEPH GUTTENSTEIN.